United States Patent
Murakami et al.

(10) Patent No.: US 11,480,454 B2
(45) Date of Patent: Oct. 25, 2022

(54) METHOD FOR MANUFACTURING MEASUREMENT PIPELINE PORTION OF ULTRASONIC FLOW METER

(71) Applicant: RYUSOK CO., LTD., Okinawa-Ken (JP)

(72) Inventors: Eiichi Murakami, Tokyo (JP); Kohei Sakiyama, Tokyo (JP)

(73) Assignee: RYUSOK CO., LTD., Okinawa-Ken (JP)

(*) Notice: Subject to any disclaimer, the term of this patent is extended or adjusted under 35 U.S.C. 154(b) by 564 days.

(21) Appl. No.: 16/409,556

(22) Filed: May 10, 2019

(65) Prior Publication Data

US 2019/0353508 A1    Nov. 21, 2019

(30) Foreign Application Priority Data

May 16, 2018  (JP) ............... JP2018-094632
Jul. 27, 2018  (JP) ............... JP2018-141510
Aug. 9, 2018   (JP) ............... JP2018-150418

(51) Int. Cl.
*G01F 1/66*   (2022.01)
*B29C 45/26*  (2006.01)

(52) U.S. Cl.
CPC .......... *G01F 1/662* (2013.01); *B29C 45/2612* (2013.01)

(58) Field of Classification Search
CPC ....... G01F 1/66; G01F 1/662; B29C 45/2612; B29C 2049/5803; B29C 2793/009; B29C 2793/0027; B29C 2049/0089; B29L 2023/22; B29L 2023/0044; B29L 2031/752; B29D 23/003; B29D 23/18
See application file for complete search history.

(56) References Cited

U.S. PATENT DOCUMENTS

2005/0154070 A1* 7/2005 Suzuki ............... B29B 17/0036
                                                    524/495
2008/0246277 A1* 10/2008 Gallagher ............ F16L 9/147
                                                    285/148.13

(Continued)

FOREIGN PATENT DOCUMENTS

CN     101365927 A     2/2009
JP     1985-115810 A   6/1985
(Continued)

*Primary Examiner* — Manuel A Rivera Vargas
*Assistant Examiner* — Yaritza H Perez Bermudez
(74) *Attorney, Agent, or Firm* — Li & Cai Intellectual Property (USA) Office

(57) ABSTRACT

A soft-melted parison is disposed in molds forming a shape of a measurement pipeline portion 10, the parison is expanded by means of gas inflow, and blow molding is performed. The shapes of a pipe body 11, a fluid inlet portion 12, and a fluid outlet portion 13 are formed by an inner mold of the molds. Ultrasonic wave input-output portions 14a and 14b bulging outwards in a sealed manner are formed on both sides positioned in the oblique direction of the pipe body 11 with respect to a center line of the pipe body 11. Parts of the ultrasonic wave input-output portions 14a and 14b are wall surfaces 15a and 15b for attaching ultrasonic wave transmission-reception units. The measurement pipeline portion 10 is obtained by cutting end portions of the fluid inlet portion 12 and the fluid outlet portion 13 after the parison is solidified.

4 Claims, 10 Drawing Sheets

(56) References Cited

U.S. PATENT DOCUMENTS

| | | | | |
|---|---|---|---|---|
| 2011/0198526 A1* | 8/2011 | Tappe | ............... | F16K 5/0689 |
| | | | | 251/315.1 |
| 2013/0124131 A1* | 5/2013 | Murakami | ............. | G01F 1/662 |
| | | | | 702/100 |
| 2014/0031176 A1* | 1/2014 | Knopow | ................ | A61H 3/00 |
| | | | | 135/65 |
| 2014/0260668 A1* | 9/2014 | Liu | ....................... | G01F 1/662 |
| | | | | 73/861.28 |
| 2015/0370262 A1* | 12/2015 | Hanaoka | ............... | B29C 45/76 |
| | | | | 137/557 |
| 2016/0257052 A1* | 9/2016 | Sun | ..................... | B32B 27/306 |
| 2017/0043503 A1* | 2/2017 | Suzuki | ................ | B29B 7/7404 |
| 2019/0186968 A1* | 6/2019 | Bar-on | ................... | G01F 1/662 |
| 2019/0276615 A1* | 9/2019 | Someya | ............... | C08L 55/005 |
| 2020/0171539 A1* | 6/2020 | Wiest | .................... | G01F 1/662 |
| 2020/0340838 A1* | 10/2020 | Murakami | ............. | G01F 1/667 |
| 2020/0363248 A1* | 11/2020 | Ito | ...................... | G01F 1/6842 |
| 2021/0003435 A1* | 1/2021 | Fang | ................... | G01F 15/185 |
| 2021/0054932 A1* | 2/2021 | Koike | ................... | F16J 15/062 |

FOREIGN PATENT DOCUMENTS

| | | | |
|---|---|---|---|
| JP | 1995-311063 A | 11/1995 | |
| TW | 200307807 A | 12/2003 | |
| TW | 201532782 A | 9/2015 | |
| TW | 201734412 A | 10/2017 | |

\* cited by examiner

METHOD FOR MANUFACTURING MEASUREMENT PIPELINE PORTION OF ULTRASONIC FLOW METER

BACKGROUND OF THE INVENTION

1. Field of the Invention

The present invention relates to a method for manufacturing a measurement pipeline portion of an ultrasonic flow meter for detecting a flow velocity by propagating an ultrasonic beam into a fluid.

2. Description of Related Art

In a general ultrasonic flow meter, ultrasonic beams are alternately propagated in flow velocity and counter-flow velocity directions with respect to a measurement fluid flowing through a measurement pipeline portion and the flow velocity of the fluid, that is, the flow rate of the fluid is measured by means of propagation time detection and a time difference method.

In this case, the ultrasonic beam propagation with respect to the fluid includes propagation methods based on the disposition difference between a pair of ultrasonic wave transmission-reception units, examples of which include Z, V, and I methods.

For example, JP-A-7-311063 discloses a device that transmits and receives an ultrasonic beam obliquely to a pipe body. As illustrated in FIG. 24, according to JP-A-7-311063, a pair of ultrasonic wave transmission-reception units 2a and 2b are disposed so as to obliquely face a pipe body 1 through which a measurement fluid flows in the direction that is indicated by the arrows.

SUMMARY OF THE INVENTION

According to JP-A-7-311063, it is necessary to provide a branch pipe 3 outwards from the pipe body 1 including a straight pipe portion and attach the ultrasonic wave transmission-reception units 2a and 2b inside the branch pipe 3. As a result, inconvenience arises as, for example, a liquid leakage countermeasure should be taken.

In addition, as illustrated in FIG. 25, for example, JP-A-60-115810 discloses a form in which the ultrasonic wave transmission-reception units 2a and 2b are attached to both sides of a straight pipe portion 4 so as to face each other and an inflow pipe 5 and an outflow pipe 6 are orthogonal to and attached in the same direction to the straight pipe portion 4.

In any case, it is preferable for inexpensiveness that such a measurement pipeline portion can be integrally manufactured from a synthetic resin and by mold-based injection molding. However, due to the complex structure of the measurement pipeline portion, it is not easy to integrally manufacture the measurement pipeline portion by injection molding.

Accordingly, when measurement pipeline portions as illustrated in FIGS. 24 and 25 are manufactured, injection molding is performed after division into several members and the members are joined by welding or the like in general.

The welding-based joining, however, results in burrs or the like inside a welded portion. Then, measurement accuracy is affected as the burrs and the like become pipe resistance and disturb the flow velocity distribution of the fluid.

In addition, the inner surface of the pipe body is molded in contact with the mold during the injection molding. Accordingly, fine metal powder abraded from the mold or eluted metal ions may remain in the pipe body, and problems arise when the metal powder or the metal ions are mixed with the fluid and adversely affect a fluid component.

An object of the present invention, which is to solve the above-mentioned problems, is to provide a method for manufacturing a measurement pipeline portion of an ultrasonic flow meter by which no fluid component is adversely affected and integral manufacturing is possible even in the event of a complex shape by a measurement pipeline portion being formed by blow molding.

A method for manufacturing a measurement pipeline portion of an ultrasonic flow meter related to the present invention is a method for manufacturing the measurement pipeline portion by blow molding and by using a mold divisible into a plurality of pieces and having an inner mold forming an outer surface of the measurement pipeline portion including a straight pipe-shaped pipe body, a fluid inlet portion disposed in one end portion of the pipe body, a fluid outlet portion disposed in the other end portion of the pipe body, and a pair of ultrasonic wave input-output portions for attaching an ultrasonic wave transmission-reception unit transmitting and receiving an ultrasonic beam to and from an inside of the pipe body. The method includes a step of opening the mold and storing a tubular parison as a soft-melted thermoplastic synthetic resin material in the mold, a step of molding the measurement pipeline portion by closing the mold, expanding the parison by injecting a gas into the parison, and bringing an outer surface of the parison into close contact with the inner mold of the mold, a step of taking out the solidified measurement pipeline portion by opening the mold after cooling the parison, and a step of cutting end portions of the fluid inlet portion and the fluid outlet portion of the measurement pipeline portion.

The method for manufacturing a measurement pipeline portion of an ultrasonic flow meter according to the present invention is based on blow molding. Accordingly, integral molding is possible even when the measurement pipeline portion has a complex structure. In addition, no pipeline resistance is generated on the inner surface of the measurement pipeline portion and a satisfactory flow velocity distribution can be obtained.

In addition, the blow molding is performed on the measurement pipeline portion with the parison expanded by the gas, and thus the mold does not come into contact with the inner surface of the pipe body. Accordingly, metal ions or fine metal powder from the mold does not adhere inside the pipe body and a fluid component to be measured is not adversely affected.

DETAILED DESCRIPTION OF THE PREFERRED EMBODIMENTS

First Example

Figure 1:
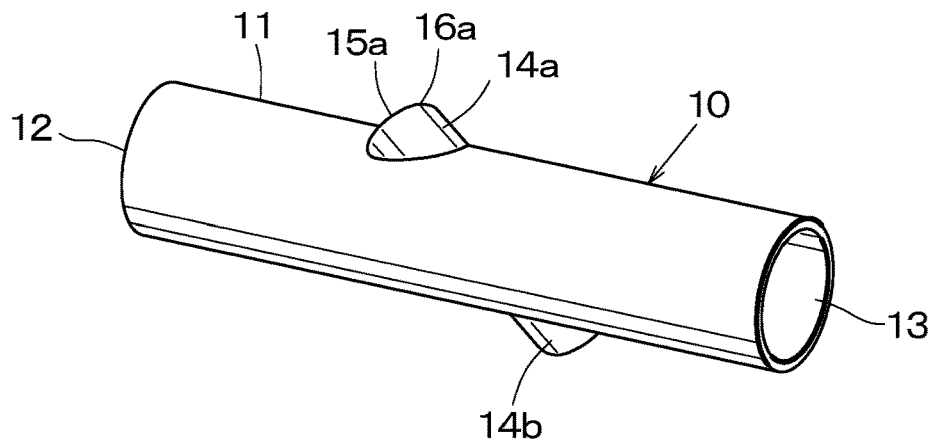
FIG. 1 is a perspective view of a measurement pipeline portion according to a first example.
Figure 2:
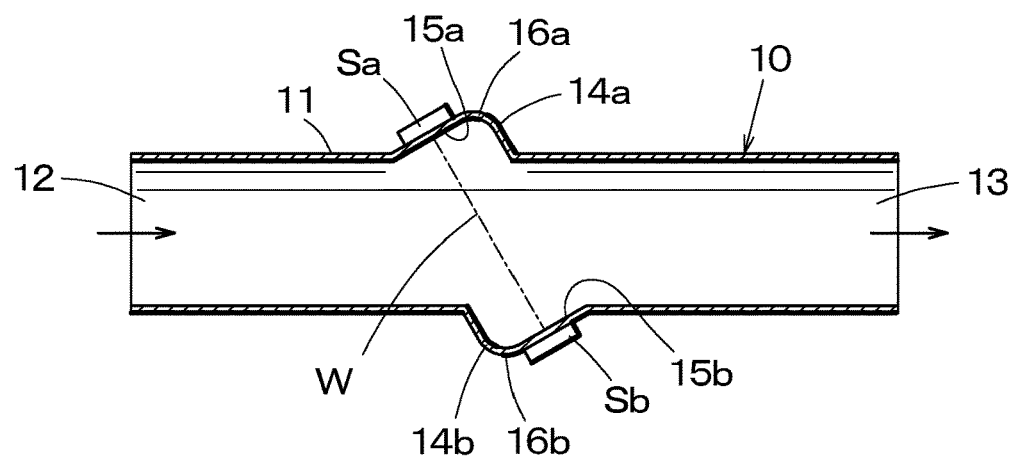
FIG. 2 is a cross-sectional view of the measurement pipeline portion.

FIG. 1 is a perspective view of a measurement pipeline portion 10 according to a first example, and FIG. 2 is a cross-sectional view of the measurement pipeline portion 10.

The measurement pipeline portion 10 is manufactured by blow molding, and both end portions of a straight pipe-shaped pipe body 11 are a fluid inlet portion 12 and a fluid outlet portion 13. Sealed ultrasonic wave input-output portions 14a and 14b bulging to the outside of the pipe body 11 are formed in two places on both sides positioned obliquely to the longitudinal center line of the pipe body 11. The outer shapes of the ultrasonic wave input-output portions 14a and 14b are formed as if a column body is obliquely embedded in the pipe body 11.

The ultrasonic wave input-output portions 14a and 14b are provided with planar wall surfaces 15a and 15b, which directly face each other and correspond to both end surfaces of the column body. As illustrated in FIG. 2, ultrasonic wave transmission-reception units Sa and Sb can be attached to the wall surfaces 15a and 15b, respectively. Each of the ultrasonic wave transmission-reception units Sa and Sb incorporates a piezoelectric element and a piezo element constitutes the piezoelectric element. Ultrasonic beams alternately transmitted from the ultrasonic wave transmission-reception units Sa and Sb are received by the ultrasonic wave transmission-reception units Sa and Sb on the directly facing opposite sides through an oblique propagation path W interconnecting the wall surfaces 15a and 15b.

Figure 3:
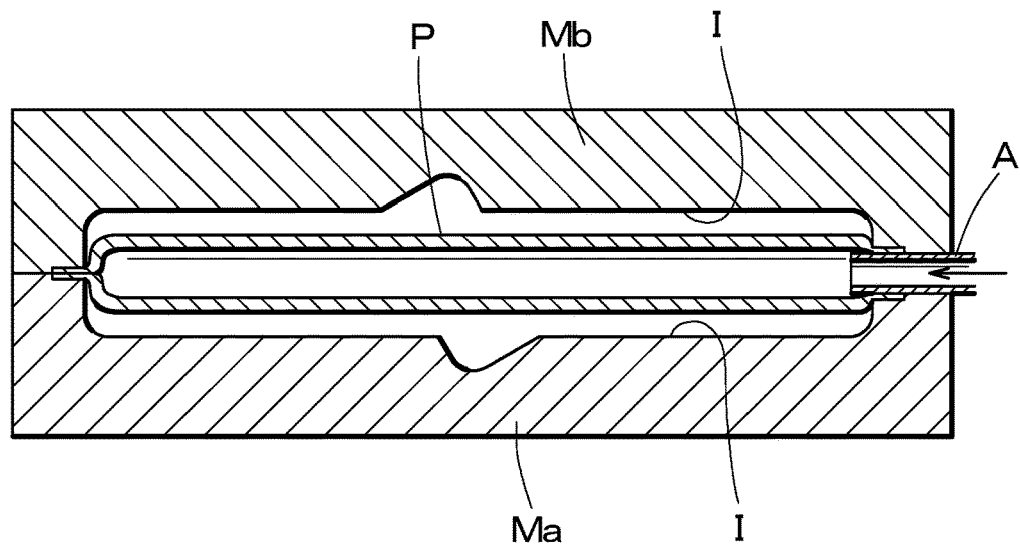
FIG. 3 is an explanatory diagram illustrating blow molding.

The measurement pipeline portion 10 is manufactured by a blow molding method suitable for manufacturing a hollow plastic product. In other words, as illustrated in FIG. 3, a so-called parison P, which is a soft-melted tubular thermoplastic synthetic resin material, is stored in an inner mold I of molds Ma and Mb resulting from division into a plurality of pieces such as two. Both tips of the parison P are sandwiched between the molds Ma and Mb, sealing is performed for a bag shape, and the molds Ma and Mb are closed.

Next, a gas such as air is blown into the parison P in the arrow direction via an air pipe A, which is attached to at least one of the fluid inlet portion 12 and the fluid outlet portion 13. Then, the parison P is expanded and the outer surface of the parison P is brought into close contact with the inner mold I of the molds Ma and Mb. Performed in this manner is blow molding of the measurement pipeline portion 10 molded by the inner mold I and having a thickness of, for example, approximately 2 mm.

Figure 4:
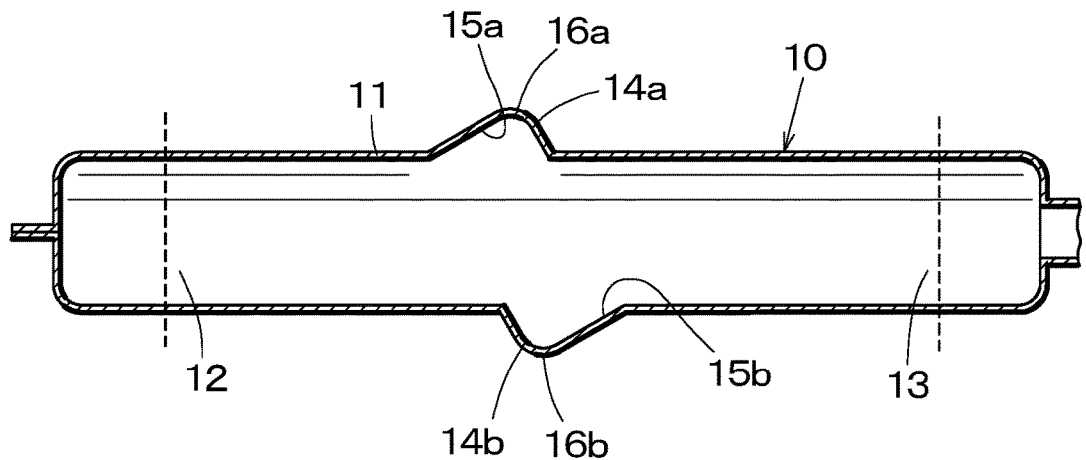
FIG. 4 is a cross-sectional view of the measurement pipeline portion manufactured by the blow molding.

After the measurement pipeline portion 10 is solidified, the measurement pipeline portion 10 is taken out by the molds Ma and Mb being opened. Subsequently, the end portions of the fluid inlet portion 12 and the fluid outlet portion 13 at both ends of the pipe body 11 are cut at the dotted-line parts as illustrated in FIG. 4. Then, both ends of the pipe body 11 become the fluid inlet portion 12 and the fluid outlet portion 13 continuous with the same diameter and the measurement pipeline portion 10 illustrated in FIG. 1 is obtained.

Incidentally, the acute angle parts that are outlines protruding to the outsides of the columnar shapes of the ultrasonic wave input-output portions 14a and 14b are ridgeline portions 16a and 16b, which are chamfered, rounded, and smooth so as not to become pointed portions.

Figure 5:
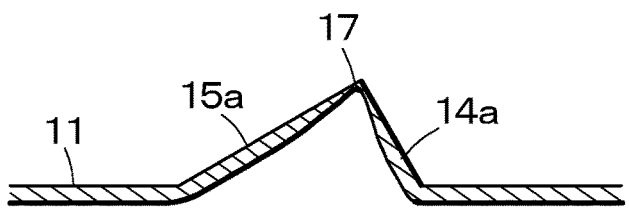
FIG. 5 is an explanatory diagram of an acute angle part resulting from the blow molding.

If the inner mold I of the molds Ma and Mb forming the ultrasonic wave input-output portions 14a and 14b has a corner angle part close to an acute angle during the blow molding, the parison P does not sufficiently spread to the inner wall part of the inner mold I and a corner angle part 17 as the acute angle part becomes a thin-walled structure as illustrated in FIG. 5.

The corner angle part 17 having the thin-walled structure is degraded in pressure resistance performance. Accordingly, in some cases where the measurement pipeline portion 10 in this state is used, the corner angle part 17 may be broken by the internal pressure of a fluid and the measurement pipeline portion 10 may become unusable.

In this regard, blow molding is performed after the inner mold I of the molds Ma and Mb is processed such that the acute angle parts of the ultrasonic wave input-output portions 14a and 14b become the smooth ridgeline portions 16a and 16b. As a result, the acute angle parts disappear, and thus the parison P evenly spreads on the inner surface of the inner mold I of the molds Ma and Mb, bringing about no thin-walled structure part.

During measurement, a fluid pipeline is connected to the fluid inlet portion 12 and the fluid outlet portion 13 and a fluid to be measured is measured by means of an ultrasonic beam in the measurement pipeline portion 10. In other words, a fluid is allowed to flow into the pipe body 11 from the fluid inlet portion 12, measured in the pipe body 11, and allowed to flow out from the fluid outlet portion 13.

In the first example, the ultrasonic wave input-output portion 14a and 14b are formed toward the outside of the pipe body 11. However, it is possible to form at least one of the ultrasonic wave input-output portion 14a and 14b toward the inside of the pipe body 11.

Second Example

Figure 6:
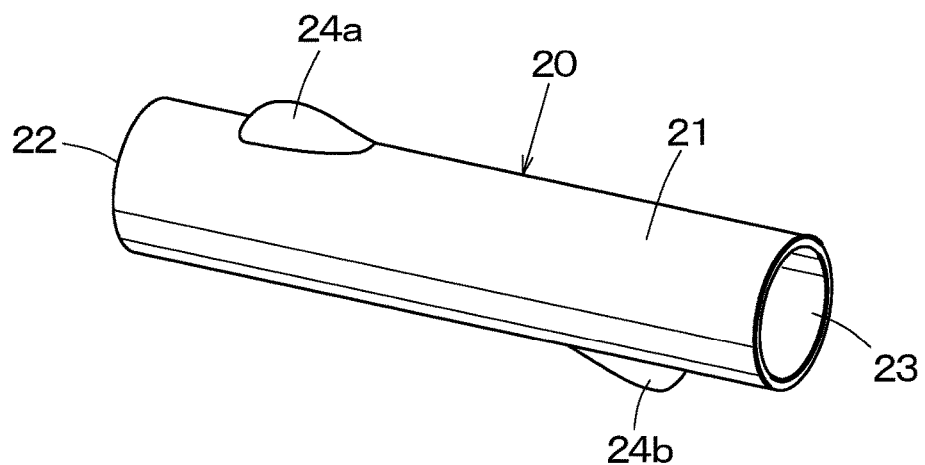
FIG. 6 is a perspective view of a measurement pipeline portion according to a second example.
Figure 7:
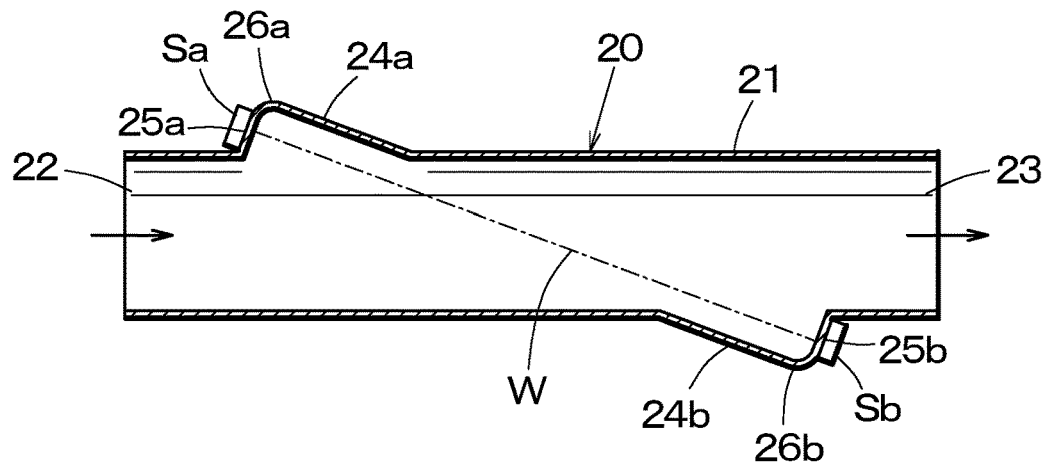
FIG. 7 is a cross-sectional view of the measurement pipeline portion.

FIG. 6 is a perspective view of a measurement pipeline portion 20 according to a second example, and FIG. 7 is a cross-sectional view of the measurement pipeline portion 20.

In view of the measurement accuracy and the usability of an ultrasonic flow meter, it is desirable that a pipe body 21 of the measurement pipeline portion 20 has a long straight pipe shape including a fluid inlet portion 22 and a fluid outlet portion 23 and the length of the propagation path W is increased.

For this purpose, in the measurement pipeline portion 20 based on blow molding similar to the blow molding according to the first example, the pipe body 21 has a sufficient length, one end is the fluid inlet portion 22, and the other end is the fluid outlet portion 23. In the pipe body 21, an ultrasonic beam propagates through the oblique propagation path W that is almost parallel to the center line of the pipe body 21.

As in the case of the first example, both ends of the propagation path W are ultrasonic wave input-output portions 24a and 24b where the pipe body 21 bulges outwards in part. As illustrated in FIG. 7, parts of the ultrasonic wave input-output portions 24a and 24b are planar wall surfaces 25a and 25b to which the pair of ultrasonic wave transmission-reception units Sa and Sb can be attached and the wall surfaces 25a and 25b are disposed so as to directly face each other via the propagation path W. As in the case of the first example, the acute angle parts that protrude to the outsides of the ultrasonic wave input-output portions 24a and 24b are rounded and smooth ridgeline portions 26a and 26b.

Figure 8:
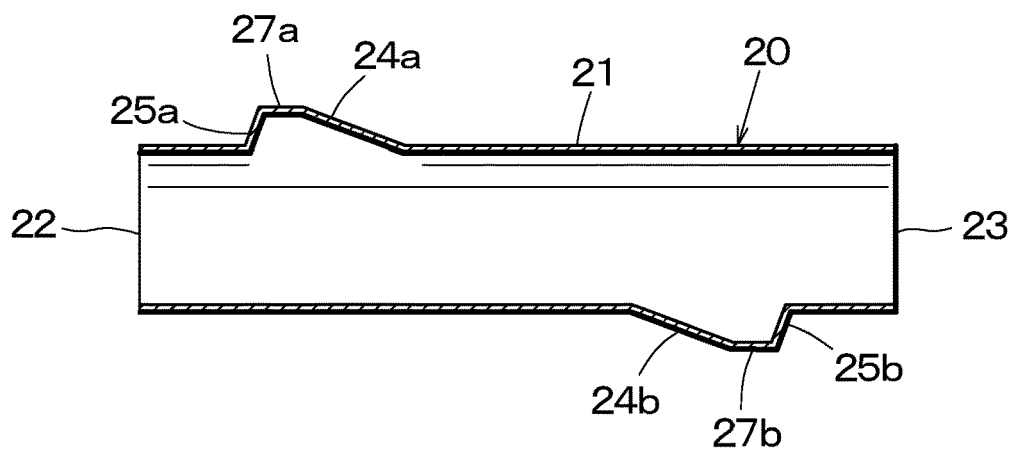
FIG. 8 is a cross-sectional view of a modification example of the second example.

It should be noted that the ultrasonic wave input-output portions 24a and 24b may have a shape forming no acute angle part instead of the rounded and smooth ridgeline portions 26a and 26b. For example, flat portions 27a and 27b substantially parallel to the surface of the pipe body 21 may be provided outside the ultrasonic wave input-output portions 24a and 24b as in the modification example that is illustrated in FIG. 8.

In this modification example, formation of a thin-walled structure part by the parison P is prevented as a corner angle part is almost eliminated by the flat portions 27a and 27b being provided. Incidentally, a flat portion may be similarly provided in the first example and a third example (described below) as well.

Third Example

Figure 9:
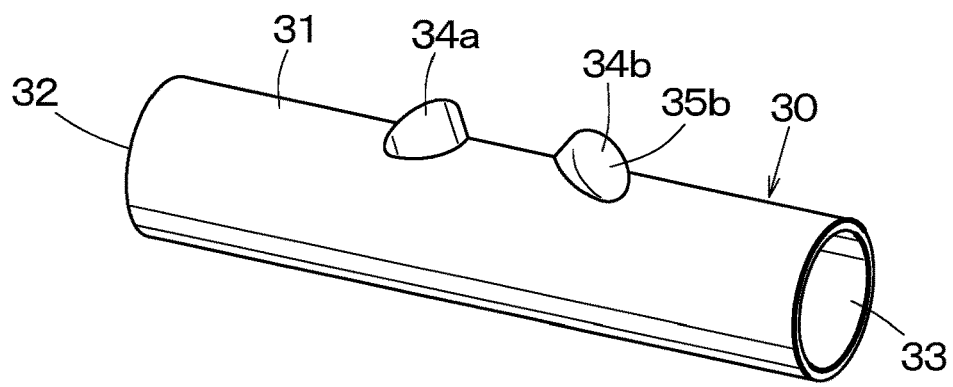
FIG. 9 is a perspective view of a measurement pipeline portion according to a third example.
Figure 10:
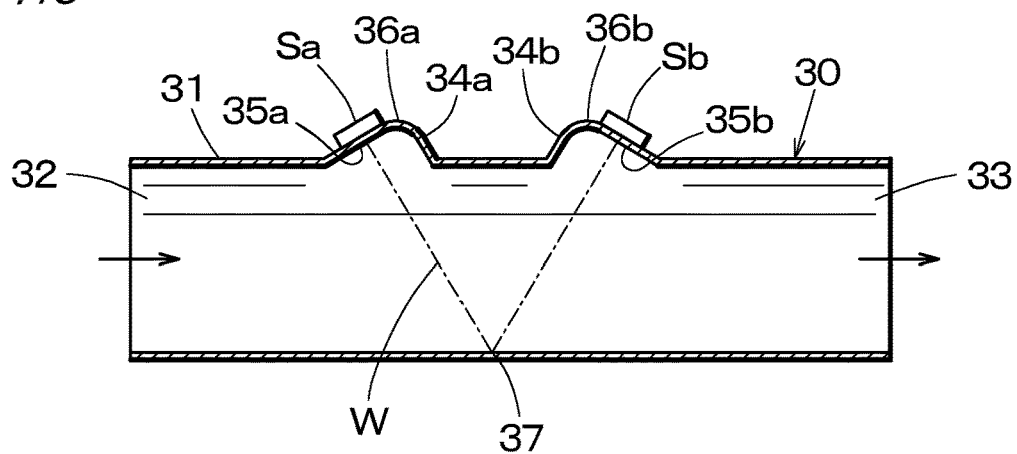
FIG. 10 is a cross-sectional view of the measurement pipeline portion.

FIG. 9 is a perspective view of a measurement pipeline portion 30 according to the third example, and FIG. 10 is a cross-sectional view of the measurement pipeline portion 30.

The measurement pipeline portion 30 of the third example is manufactured by blow molding as in the case of the previous examples. Both end portions of a straight pipe-shaped pipe body 31 are a fluid inlet portion 32 and a fluid outlet portion 33. Ultrasonic wave input-output portions 34a and 34b bulging to the outside of the pipe body 31 are formed in two places parallel to the center line of one side of the pipe body 31 and spaced apart from each other.

As illustrated in FIG. 10, the ultrasonic wave input-output portions 34a and 34b are provided with wall surfaces 35a and 35b to which the ultrasonic wave transmission-reception units Sa and Sb are attached. As in the case of the first example, the corner angle parts that protrude to the outsides of the ultrasonic wave input-output portions 34a and 34b are smooth ridgeline portions 36a and 36b. In addition, the wall surfaces 35a and 35b face a reflecting portion 37, which is a place on the inner wall surface of the pipe body 31.

As illustrated in FIG. 10, ultrasonic beams alternately transmitted from the ultrasonic wave transmission-reception units Sa and Sb attached to the wall surfaces 35a and 35b are reflected by the reflecting portion 37 in the pipe body 31 and received via the V-shaped propagation path W by the ultrasonic wave transmission-reception units Sa and Sb on the opposite sides.

According to the third example, an ultrasonic beam is reflected in the pipe body 31, and thus the length of the propagation path W can be increased even in a case where the pipe body 31 is short.

Fourth Example

Figure 11:
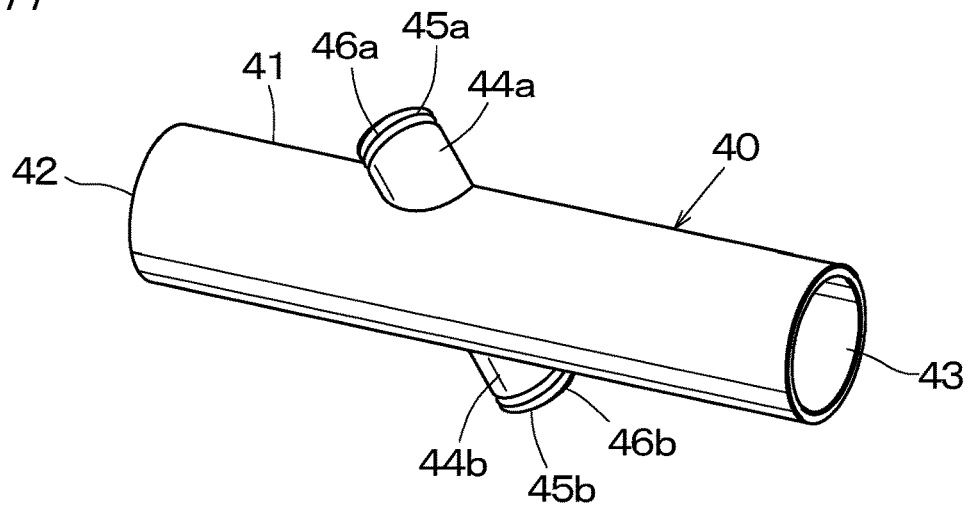
FIG. 11 is a perspective view of a measurement pipeline portion according to a fourth example.
Figure 12:
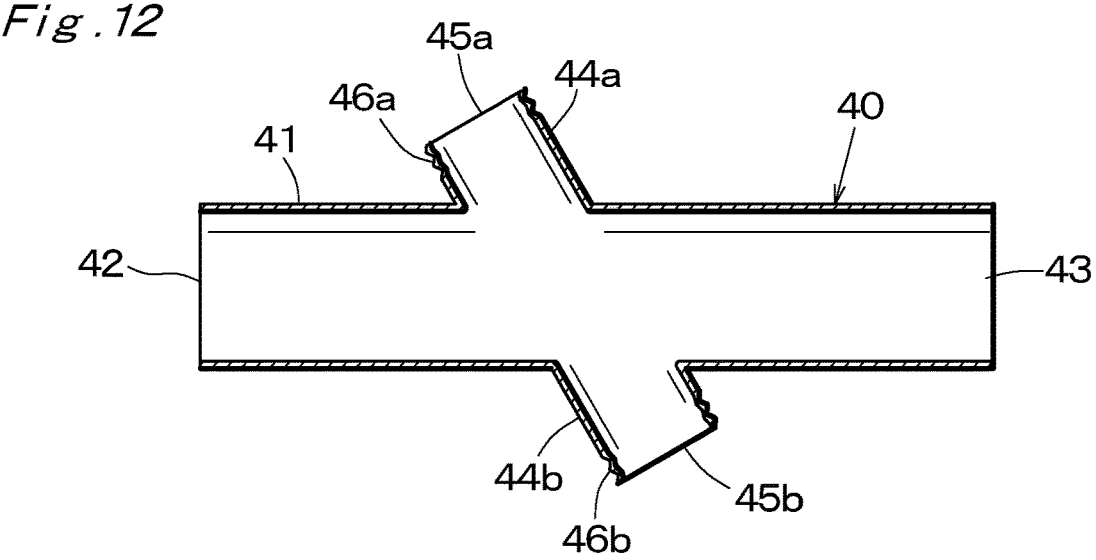
FIG. 12 is a cross-sectional view of the measurement pipeline portion.

FIG. 11 is a perspective view of a measurement pipeline portion 40 according to a fourth example, and FIG. 12 is a cross-sectional view of the measurement pipeline portion 40.

In the blow molding-based measurement pipeline portion 40, both end portions of a pipe body 41 are a fluid inlet portion 42 and a fluid outlet portion 43. Ultrasonic wave input-output portions 44a and 44b protruding to the outside of the pipe body 41 are formed in two places on both sides positioned in the oblique direction of the pipe body 41 with respect to the longitudinal center line of the pipe body 41. The outer shapes of the ultrasonic wave input-output portions 44a and 44b are formed as if a cylinder body is obliquely embedded in the pipe body 41. Screw grooves 46a and 46b are formed outside cylinder end portions 45a and 45b, which are at the tips of the ultrasonic wave input-output portions 44a and 44b.

Figure 13:
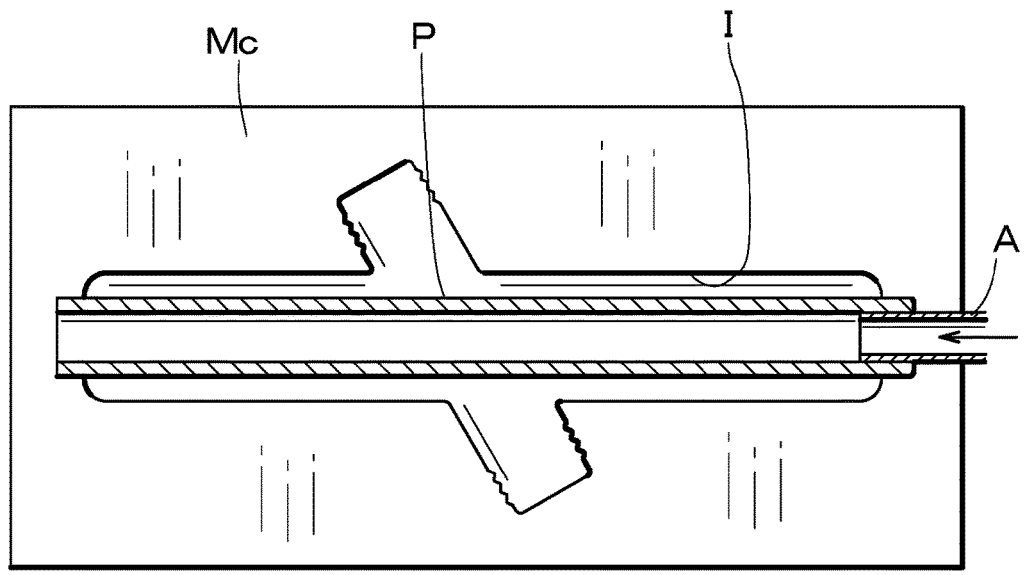
FIG. 13 is an explanatory diagram illustrating blow molding.

As illustrated in FIG. 13, the soft-melted tubular parison P is stored in the space-shaped inner mold I of symmetrical molds Mc and Md (Md not being illustrated) resulting from division into a plurality of pieces such as two. Both tips of the parison P are sandwiched between the molds Mc and Md, sealing is performed for a bag shape, and the molds Mc and Md are closed.

Next, a gas such as air is blown into the parison P from either one or both of the fluid inlet portion 42 and the fluid outlet portion 43 as in the case of the first example. Then, the parison P is expanded and the outer surface of the parison P is brought into close contact with the inner mold I of the molds Mc and Md.

As a result, blow molding of the measurement pipeline portion 40 is performed and the pipe body 41, the cylinder end portions 45a and 45b of the ultrasonic wave input-output portions 44a and 44b, and the screw grooves 46a and 46b are integrally molded.

Figure 14:
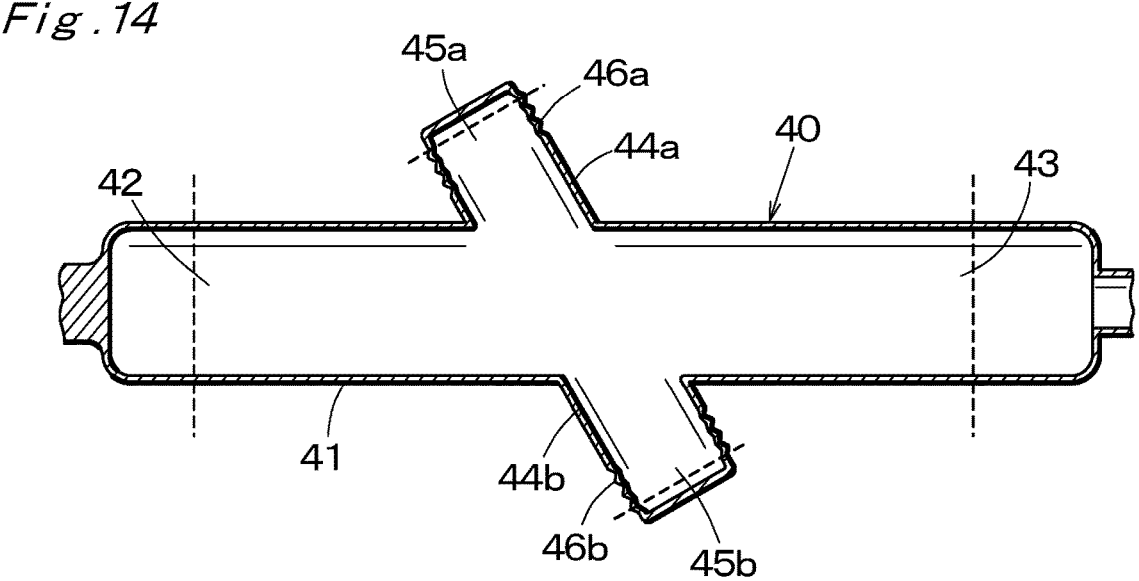
FIG. 14 is a cross-sectional view of the measurement pipeline portion manufactured by the blow molding.

Subsequently, the molded measurement pipeline portion 40 is solidified and taken out by the molds Mc and Md being opened. The measurement pipeline portion 40 as illustrated in FIG. 14 is obtained as a result. Further, cutting is performed in a total of four places, that is, the positions of the end portions of the fluid inlet portion 42 and the fluid outlet portion 43 and the cylinder end portions 45a and 45b that are indicated by the dotted lines. Then, the measurement pipeline portion 40 illustrated in FIGS. 11 and 12 is obtained.

Figure 15:
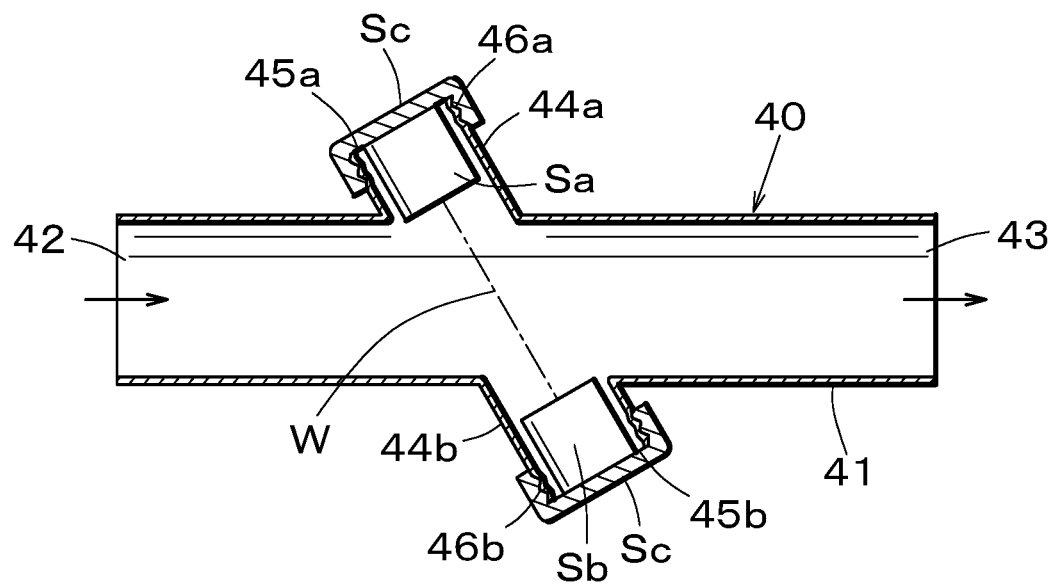
FIG. 15 is a cross-sectional view of the measurement pipeline portion in a state where an ultrasonic wave transmission-reception unit is attached.

As illustrated in FIG. 15, the ultrasonic wave transmission-reception units Sa and Sb are inserted and attached in the cylinder end portions 45a and 45b of the ultrasonic wave input-output portions 44a and 44b. The ultrasonic wave transmission-reception units Sa and Sb attached in cap nuts Sc are sealed and fixed to the screw grooves 46a and 46b outside the cylinder end portions 45a and 45b by means of screwing the cap nuts Sc and using O-rings or the like.

In other words, the ultrasonic wave transmission-reception units Sa and Sb are stored with the inner diameter of the cylinder body blocked by front and rear walls and a piezoelectric element is affixed to the inner back side of the front wall. Incidentally, the ultrasonic wave transmission-reception units Sa and Sb may be attached to the ultrasonic wave input-output portions 44a and 44b by any means other than the screwing using the cap nuts Sc.

Ultrasonic beams alternately transmitted from the ultrasonic wave transmission-reception units Sa and Sb are received by the ultrasonic wave transmission-reception units Sa and Sb on the directly facing opposite sides through the oblique propagation path W interconnecting the ultrasonic wave input-output portions 44a and 44b in the pipe body 41.

Fifth Example

Figure 16:
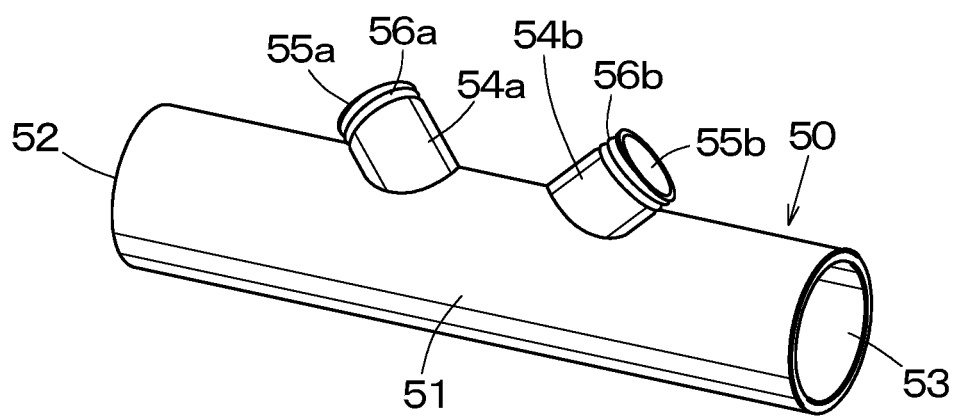
FIG. 16 is a perspective view of a measurement pipeline portion according to a fifth example.
Figure 17:
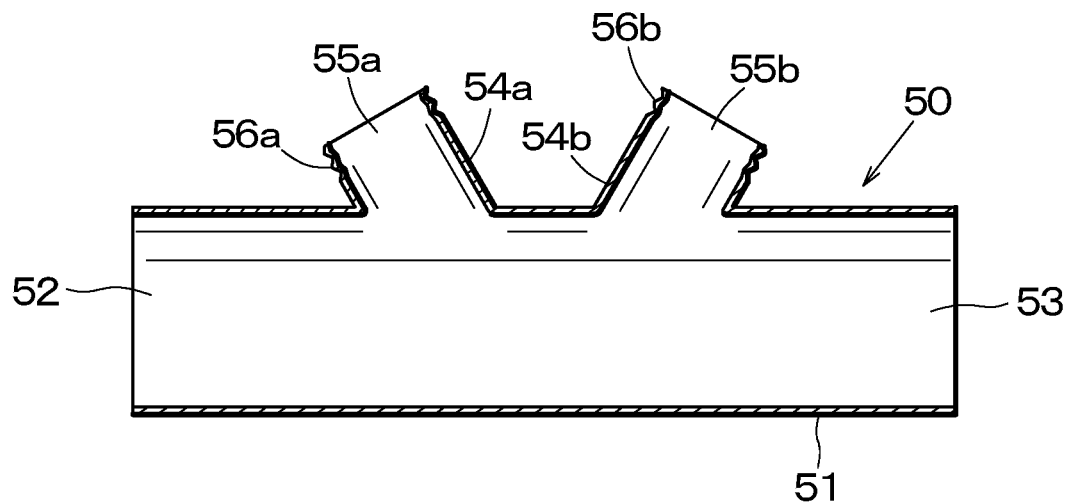
FIG. 17 is a cross-sectional view of the measurement pipeline portion.

FIG. 16 is a perspective view of a measurement pipeline portion 50 according to a fifth example, and FIG. 17 is a cross-sectional view of the measurement pipeline portion 50.

In the blow molding-based measurement pipeline portion 50, both end portions of a straight pipe-shaped pipe body 51 are a fluid inlet portion 52 and a fluid outlet portion 53. Cylindrical ultrasonic wave input-output portions 54a and 54b are formed in oblique symmetrical directions in two places outside the pipe body 51 that are longitudinally spaced apart from each other. The ultrasonic wave input-output portions 54a and 54b are provided with cylinder end portions 55a and 55b and screw portions 56a and 56b.

As in the case of FIG. 14 of the fourth example, the measurement pipeline portion 50 is obtained as a result of cutting of the end portions of the fluid inlet portion 52 and the fluid outlet portion 53 and cutting of the cylinder end portions 55a and 55b of the ultrasonic wave input-output portions 54a and 54b.

Figure 18:
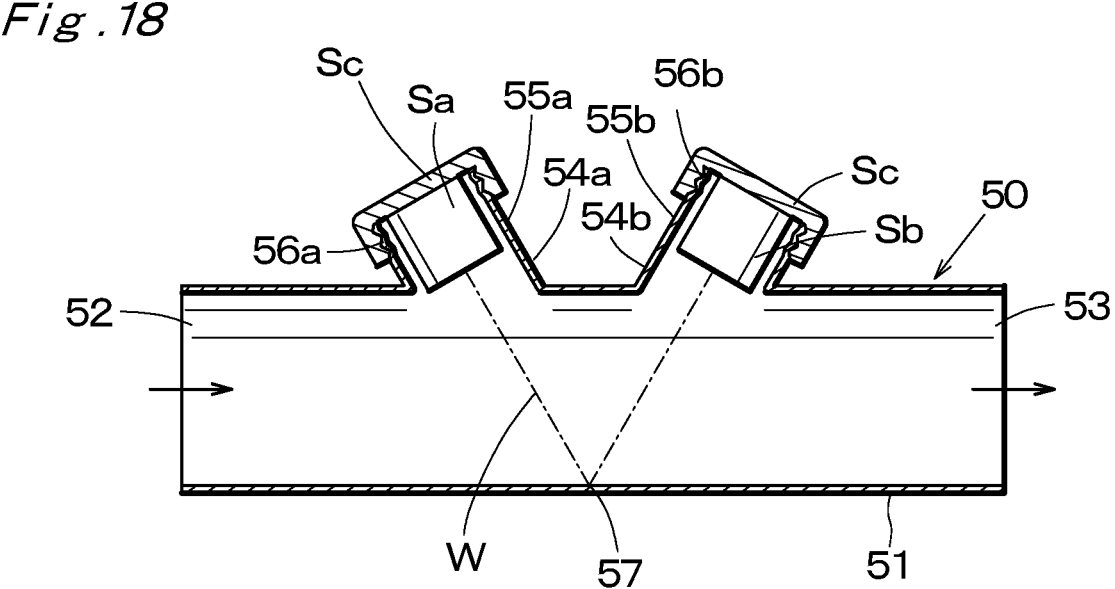
FIG. 18 is a cross-sectional view of the measurement pipeline portion in a state where an ultrasonic wave transmission-reception unit is attached.

As in the case of the fourth example and as illustrated in FIG. 18, the ultrasonic wave transmission-reception units Sa and Sb can be attached by means of the cap nuts Sc to the cylinder end portions 55a and 55b of the ultrasonic wave input-output portions 54a and 54b. The attached ultrasonic wave transmission-reception units Sa and Sb face a reflecting portion 57 in the pipe body 51.

Ultrasonic beams alternately transmitted from the ultrasonic wave transmission-reception units Sa and Sb are reflected by the reflecting portion 57 in the pipe body 51 and received by the ultrasonic wave transmission-reception units Sa and Sb on the opposite sides via the V-shaped propagation path W.

Sixth Example

Figure 19:
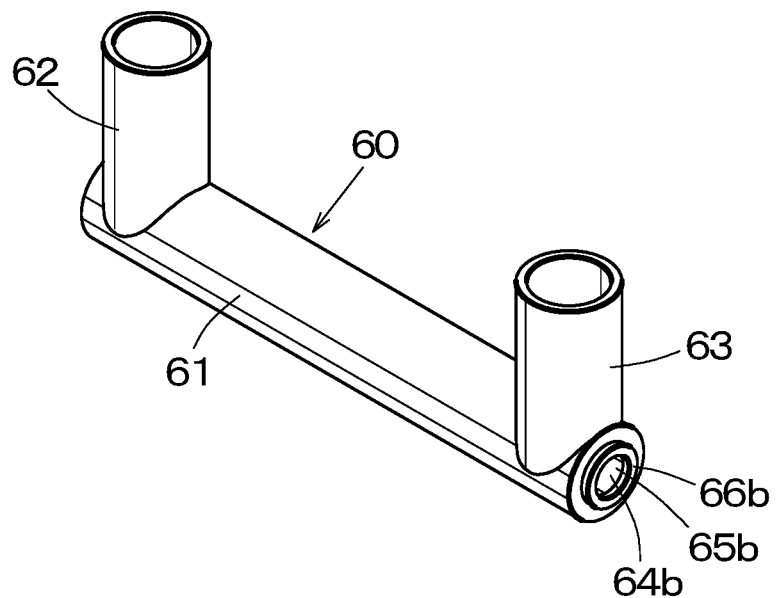
FIG. 19 is a perspective view of a measurement pipeline portion according to a sixth example.
Figure 20:
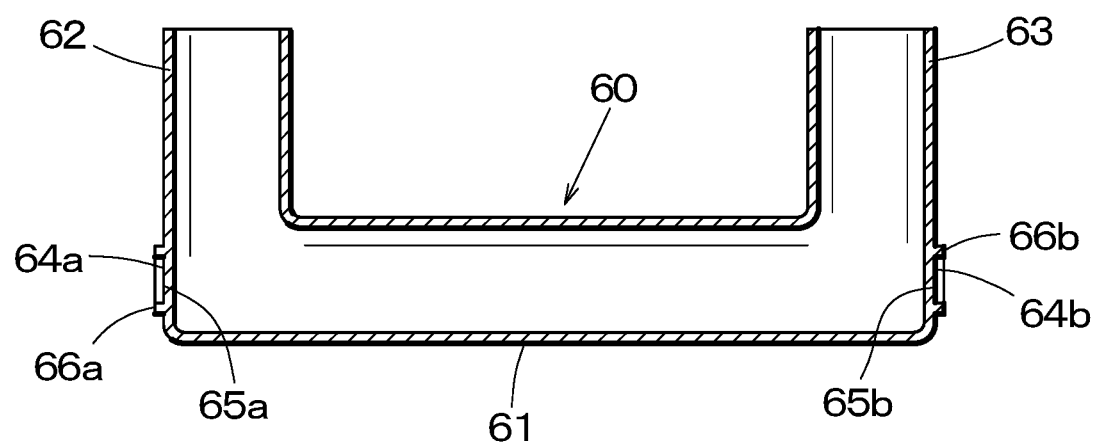
FIG. 20 is a cross-sectional view of the measurement pipeline portion.

FIG. 19 is a perspective view of a measurement pipeline portion 60 according to a sixth example, and FIG. 20 is a cross-sectional view of the measurement pipeline portion 60.

In the blow molding-based measurement pipeline portion 60, a pipe-shaped fluid inlet portion 62 and a pipe-shaped fluid outlet portion 63 are connected to a pipe body 61 in the same direction in the vicinity of both pipe ends of the straight pipe-shaped pipe body 61 such that each of the fluid inlet portion 62 and the fluid outlet portion 63 is orthogonal to the pipe body 61. Both longitudinal pipe ends of the pipe body 61 are ultrasonic wave input-output portions 64a and 64b. Wall surfaces 65a and 65b for ultrasonic wave transmission-reception unit attachment are formed at parts of the ultrasonic wave input-output portions 64a and 64b. The wall surfaces 65a and 65b face and directly face each other. Annular guide portions 66a and 66b guiding ultrasonic wave transmission-reception units are formed on the outer surfaces of the wall surfaces 65a and 65b.

Figure 21:
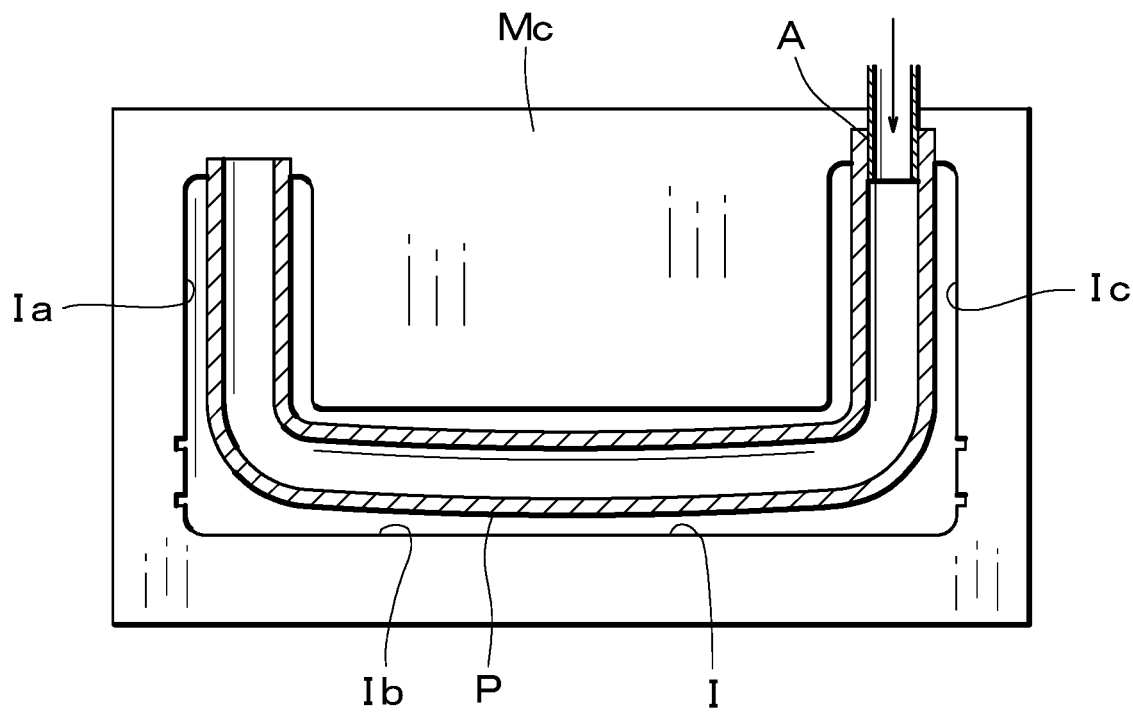
FIG. 21 is an explanatory diagram illustrating blow molding.

As illustrated in FIG. 21, the soft-melted tubular parison P is stored along an inner mold Ia, an inner mold Ib, and an inner mold Ic of symmetrical molds Me and Mf (Mf not being illustrated) resulting from division into a plurality of pieces such as two. The inner mold Ia is to mold the pipe-shaped fluid inlet portion 62. The inner mold Ib is to mold the pipe body 61. The inner mold Ic is to mold the pipe-shaped fluid outlet portion 63. In addition, both tips of the parison P are sandwiched between the molds Me and Mf, sealing is performed for a bag shape, and the molds Me and Mf are closed.

Next, a gas such as air is blown into the parison P via the air pipe A from either one or both of the fluid inlet portion 62 and the fluid outlet portion 63. Then, the parison P is expanded and the outer surface of the parison P is brought into close contact with the inner molds Ia, Ib, and Ic of the molds Me and Mf Blow molding of the measurement pipeline portion 60 is performed in this manner.

Figure 22:
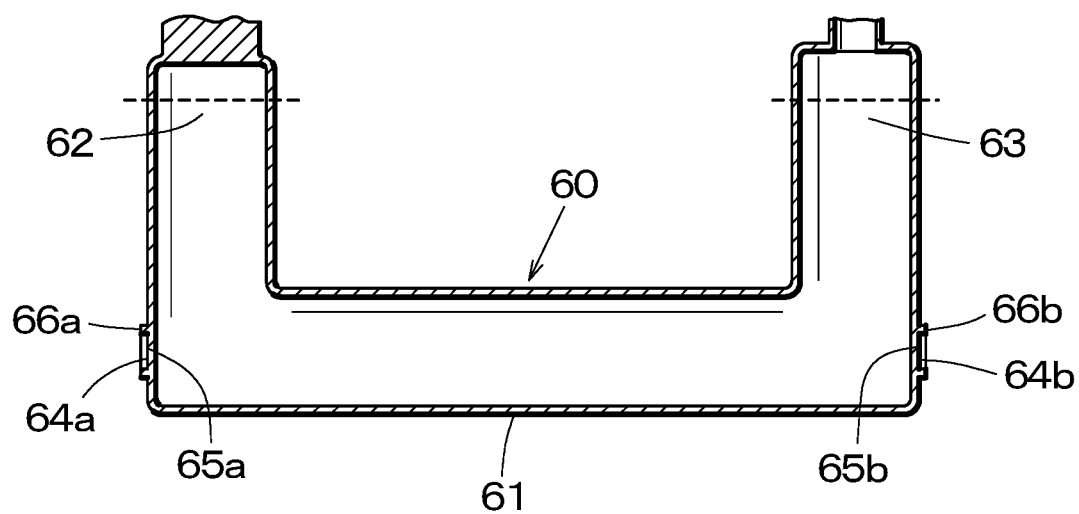
FIG. 22 is a cross-sectional view of the measurement pipeline portion manufactured by the blow molding.

Subsequently, the measurement pipeline portion 60 molded by the inner molds Ia, Ib, and Ic is solidified and taken out by the molds Me and Mf being opened. The measurement pipeline portion 60 as illustrated in FIG. 22 is obtained as a result. Further, the end portions of the fluid inlet portion 62 and the fluid outlet portion 63 that are respectively blocked are cut at the positions indicated by the dotted lines. Then, the measurement pipeline portion 60 illustrated in FIGS. 19 and 20 is obtained.

Figure 23:
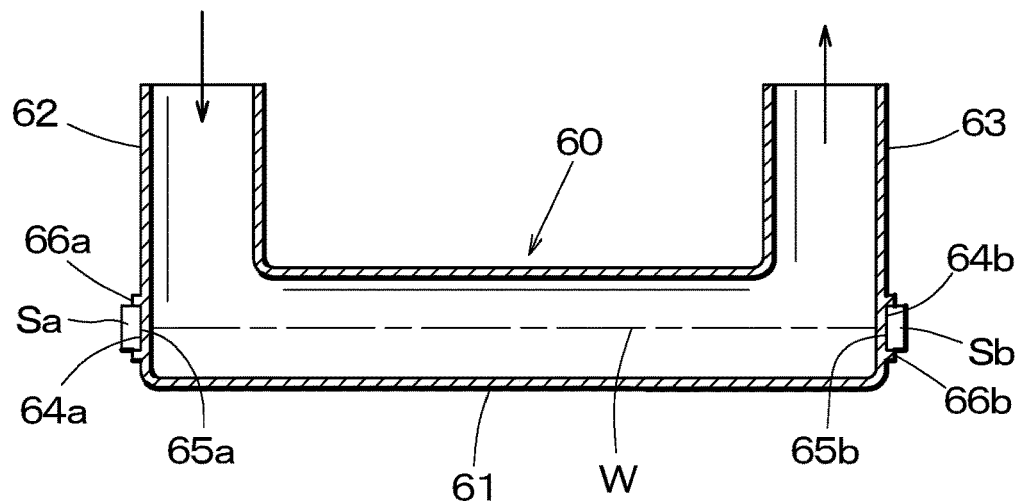
FIG. 23 is a cross-sectional view of the measurement pipeline portion in a state where an ultrasonic wave transmission-reception unit is attached.
Figure 24:
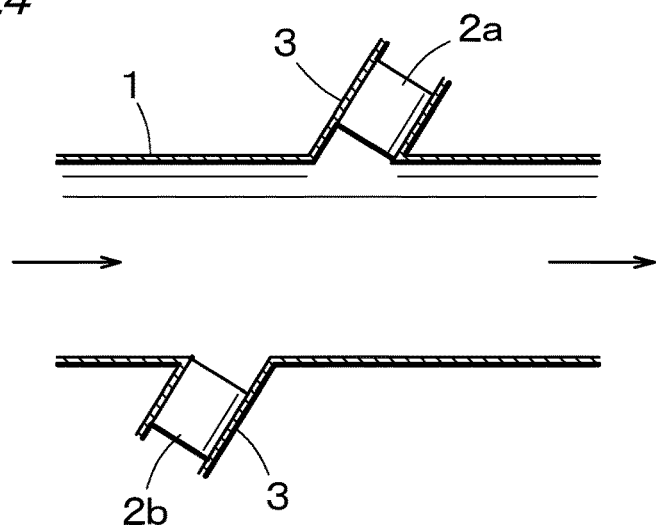
FIG. 24 is a cross-sectional view of a measurement pipeline portion according to a conventional example.
Figure 25:
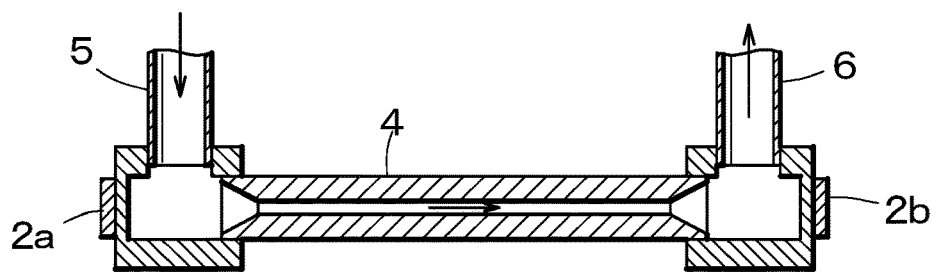
FIG. 25 is a cross-sectional view of a measurement pipeline portion according to another conventional example.

As indicated by the arrows in FIG. 23, a fluid to be measured flows into the right-angle-direction pipe body 61 from the fluid inlet portion 62, is measured by ultrasonic beams, and flows out from the right-angle-direction fluid outlet portion 63. The ultrasonic wave transmission-reception units Sa and Sb are attached via grease to the wall surfaces 65a and 65b of the ultrasonic wave input-output portions 64a and 64b positioned on both sides of the pipe body 61. At this time, the ultrasonic wave transmission-reception units Sa and Sb are guided by the guide portions 66a and 66b and can be attached at accurate positions. Then, the ultrasonic beams are alternately transmitted and received via the propagation path W between the ultrasonic wave transmission-reception units Sa and Sb.

In the first to sixth examples described above, flow rate calculation is performed during measurement by the fluid pipeline being connected to each of the fluid inlet portion and the fluid outlet portion, a fluid to be measured being allowed to flow into the measurement pipeline portion, ultrasonic beams being alternately transmitted and received via the propagation path W between the ultrasonic wave transmission-reception units Sa and Sb, the velocity of the fluid flowing through the pipe body being obtained, and multiplication by the cross-sectional area of the pipe body being performed. Incidentally, the velocity of the fluid is obtained based on a difference in ultrasonic beam arrival time. Description of this known flow measurement principle will be omitted.

The measurement pipeline portion is manufactured by blow molding, and thus integral molding is possible even in the event of a complex shape. The measurement pipeline portion can be manufactured without requiring inter-member joining, and thus burrs as pipeline resistance are not generated on the inner surface of the measurement pipeline portion and a satisfactory flow velocity distribution can be obtained.

Unlike in the case of injection molding, the measurement pipeline portion manufactured by blow molding is subject to no strict regulation in terms of inner surface shape and wall thickness. Conceivable as a result are variations in the inner diameter of the pipe body, the thickness of the wall surface of the ultrasonic wave input-output portion, and so on and different characteristics of the individual measurement pipeline portions that result in a measurement error. However, the measurement pipeline portion ensures measurement accuracy by performing calibration by means of individual actual flow rate flow and applying the obtained correction data.

Incidentally, during rough flow measurement that does not require a high level of accuracy, the measurement pipeline portion can be used as it is without calibration.

REFERENCE SIGNS LIST 10, 20, 30, 40, 50, 60 Measurement pipeline portion
11, 21, 31, 41, 51, 61 Pipe body
12, 22, 32, 42, 52, 62 Fluid inlet portion
13, 23, 33, 43, 53, 63 Fluid outlet portion
14, 24, 34, 44, 54, 64 Ultrasonic wave input-output portion
15, 25, 35, 65 Wall surface
16, 26, 36 Ridgeline portion
27 Flat portion
37, 57 Reflecting portion
45, 55 Cylinder end portion
46 Screw groove
66 Guide portion
Sa, Sb Ultrasonic wave transmission-reception unit
Sc Cap nut
W Propagation path
Ma, Mb, Mc, Md, Me, Mf Mold
P Parison

What is claimed is:

1. A method for manufacturing a measurement pipeline portion of an ultrasonic flow meter in an integral manner by blow molding without any assembling step, which uses a mold divisible into a plurality of pieces, wherein the mold has an inner mold forming an outer surface of the measurement pipeline portion from a parison as a material source, wherein the measurement pipeline portion includes a straight pipe-shaped pipe body, a fluid inlet portion disposed in one end portion of the pipe body, a fluid outlet portion disposed in the other end portion of the pipe body, and a pair of ultrasonic wave input-output portions for attaching an ultrasonic wave transmission-reception unit transmitting and receiving an ultrasonic beam to and from an inside of the pipe body, the method comprising:

a step of opening the mold and storing the parison being tubular-shaped as a soft-melted thermoplastic synthetic resin material in the mold;

a step of closing the mold, expanding the parison by injecting a gas into the parison, and bringing an outer surface of the parison into close contact with the inner mold of the mold to shape the measurement pipeline portion with an even thickness;

a step of taking out the solidified measurement pipeline portion by opening the mold after cooling the parison; and a step of cutting end portions of the fluid inlet portion and the fluid outlet portion of the measurement pipeline portion;

wherein the pair of ultrasonic wave input-output portions are integrally formed in a sealed and bulging manner in two places on a side surface of the pipe body, and positioned obliquely related to a center line of the pipe body, wherein each of the ultrasonic wave input-output portions has a hollow column body with an axis obliquely related to the center line of the pipe body and parallel to the ultrasonic beam, and a planar wall surface connected to an end surface of the column body, and the planar wall surfaces are directly faced to each other for attaching the ultrasonic wave transmission-reception units thereon;

wherein a part that is an outline protruding outwards from the ultrasonic wave input-output portion forms a ridgeline portion between the hollow column body and the planar wall surface, and the ridgeline portion is chamfered, rounded and smooth.

2. The method for manufacturing a measurement pipeline portion of an ultrasonic flow meter according to claim 1, wherein the fluid inlet portion and the fluid outlet portion are the respective end portions of the pipe body.

3. The method for manufacturing a measurement pipeline portion of an ultrasonic flow meter according to claim 1, wherein the gas injection into the parison is performed from at least one of the fluid inlet portion and the fluid outlet portion.

4. The method for manufacturing a measurement pipeline portion of an ultrasonic flow meter according to claim 1, wherein a part that is an outline protruding outwards from the ultrasonic wave input-output portion further forms a flat portion being substantially parallel to a surface of the pipe body.

* * * * *